(12) United States Patent
Poli et al.

(10) Patent No.: US 6,813,778 B1
(45) Date of Patent: Nov. 2, 2004

(54) METHOD AND SYSTEM FOR DOWNLOADING AND MANAGING THE ENABLEMENT OF A LIST OF CODE OBJECTS

(75) Inventors: Christopher Poli, Doylestown, PA (US); Douglas S. Makofka, Willow Grove, PA (US); Ira S. Lehrman, West Windsor, NJ (US); Christopher S. Del Sordo, Souderton, PA (US); Thomas F. Bates, IV, Richboro, PA (US)

(73) Assignee: General Instruments Corporation, Horsham, PA (US)

(*) Notice: Subject to any disclaimer, the term of this patent is extended or adjusted under 35 U.S.C. 154(b) by 718 days.

(21) Appl. No.: 09/617,627

(22) Filed: Jul. 17, 2000

Related U.S. Application Data
(60) Provisional application No. 60/148,691, filed on Aug. 16, 1999.

(51) Int. Cl.[7] .............................................. H04N 7/173
(52) U.S. Cl. ........................ 725/132; 725/140; 725/152; 725/50
(58) Field of Search ......................... 725/54, 132, 140, 725/152, 50; 709/200, 208; 717/168–178

(56) References Cited

U.S. PATENT DOCUMENTS

| | | | |
|---|---|---|---|
| 5,666,293 A | | 9/1997 | Metz et al. |
| 5,768,539 A | | 6/1998 | Metz |
| 5,790,834 A | | 8/1998 | Dreyer et al. |
| 5,798,785 A | | 8/1998 | Hendricks et al. |
| 6,161,218 A | * | 12/2000 | Taylor ........................ 717/174 |
| 6,381,742 B2 | * | 4/2002 | Forbes et al. ............... 717/176 |
| 6,393,585 B1 | * | 5/2002 | Houha et al. .................. 714/23 |
| 6,442,754 B1 | * | 8/2002 | Curtis ........................ 717/175 |
| 6,460,076 B1 | * | 10/2002 | Srinivasan .................. 709/219 |
| 6,571,389 B1 | * | 5/2003 | Spyker et al. ............... 717/176 |

FOREIGN PATENT DOCUMENTS

| | | | |
|---|---|---|---|
| EP | 0 732 850 | 9/1996 | |
| EP | 732850 A1 | * 9/1996 | ............ H04N/7/16 |
| EP | 0 752 786 | 1/1997 | |
| EP | 0 907 285 | 4/1999 | |
| EP | 0 998 141 | 5/2000 | |

OTHER PUBLICATIONS

International Preliminary Examination Report, dated Oct. 19, 2001.

* cited by examiner

*Primary Examiner*—Vivek Srivastava
*Assistant Examiner*—Matthew Demicco
(74) *Attorney, Agent, or Firm*—Steven L. Nichols; Ronald P. Kananen; Rader, Fishman & Grauer PLLC (57) ABSTRACT

A method and system manages and controls the download of programming, i.e., code objects, to a set-top terminal connected to a cable television system so as to prevent disruptions to service that may arise if only some of the objects specified are successfully downloaded and might, therefore, function improperly or conflict with existing applications. When the message to download new or additional code objects lists two or more objects to be acquired, the set-top terminal will only enable and execute downloaded objects if all the listed objects are successfully acquired. If only some of the objects the terminal has been instructed to download are acquired, those downloaded objects may either be purged or stored in memory without being enabled and executed. The system operator may specify in the message instructing the terminal to acquire new objects, whether the listed objects must be implemented as a group or not at all. The system operator may similarly specify if objects from an incomplete download are to be purged from memory.

11 Claims, 4 Drawing Sheets

METHOD AND SYSTEM FOR DOWNLOADING AND MANAGING THE ENABLEMENT OF A LIST OF CODE OBJECTS

This application claims the benefit of U.S. Provisional Application(s) No(s). 60/148,691 filed Aug. 16, 1999.

FIELD OF THE INVENTION

The present invention relates to the field of programming or re-programming a set-top terminal in a cable television system. More particularly, the present invention relates to the field of controlling the download of programming, such as an operating system or native suite objects, for a set-top terminal over the cable network for initial or upgrade programming of the set-top terminal.

BACKGROUND OF THE INVENTION

In a typical cable television system, subscribers are provided with a set-top box or terminal. The set-top terminal is a box of electronic equipment that is used to connect the subscriber's television, and potentially other electronic equipment, with the cable network. The set-top box is usually connected to the cable network through a co-axial wall outlet.

The set-top box is essentially a computer that is programmed to process the signals from the cable network so as to provide the subscriber with the cable services. These services from the cable television company typically include access to a number of television channels and, perhaps, an electronic programming guide (EPG).

Additional premium channels may also be provided to subscribers for an additional fee. Pay-per-view events and video-on-demand service may also be provided over the cable network. The set-top box is programmed to provide these services to the subscriber.

However, the services of the cable company need not be limited to providing television programming. Some cable companies are now offering internet access and e-mail service over their cable networks at speeds much faster than are available over conventional telephone lines. It is anticipated in the future that more and more services will be provided over the cable network, including perhaps even basic telephone service. Eventually, each home or office may have a single connection, via the cable network, to all electronic data services.

As the cable network and the services provided evolve, the set-top terminal must also evolve so as to be able to provide subscribers with all the services available from the cable network that are of interest to those subscribers. This set-top box evolution will primarily involve changes to the programming of the set-top box. By upgrading the software or firmware of the set-top box, the box can be made to perform more efficiently or offer new services as the cable network evolves.

In order to upgrade the population of set-top boxes on a cable network, it is preferable to transmit the new programming to the set-top boxes via the cable network itself. Otherwise, a technician must visit each subscriber to upgrade or re-program that subscriber's set-top box. Such field upgrades would obviously be at significant expense.

The headend is the facility from which the cable network operator broadcasts television signals and provides other services over the cable network. Updated software that is provided to the population of set-top terminals is broadcast from the headend over the cable network. The headend may also broadcast messages or instructions over the cable network to the set-top terminals.

As used herein, a programming code object, or code object, refers to an individual program, i.e. a piece of software or firmware, that can be downloaded to and executed by a set-top terminal. More broadly, a data object refers to any data structure, including a code object, message or instruction, that is transmitted by the headend over the cable network to one or more set-top terminals.

Frequently, in order to provide new services or to upgrade the programming in a set-top terminal, the set-top terminal must acquire several new code objects, i.e., pieces of software or firmware. These various pieces of programming may frequently interact and require each other in order to function properly. Consequently, problems arise if the set-top terminal acquires some, but not all, of the code objects that are to be downloaded as part of the programming upgrade. When the set-top terminal begins running the newly-acquired code objects, those code objects may likely function improperly or not at all due to the absence of other interdependent code objects that the set-top terminal was to have acquired and executed.

Consequently, there is a need in the art for a method of controlling the download of code objects by a set-top terminal in a cable television system so as to prevent the execution of newly-acquired code objects that require the presence of other code objects which the set-top terminal was supposed to have acquired but was unable, for whatever reason, to download.

SUMMARY OF THE INVENTION

It is an object of the present invention to meet the above-described needs and others. Specifically, it is an object of the present invention to provide a system and method of controlling the download of code objects by a set-top terminal in a cable television system so as to prevent the execution of newly-acquired code objects that require the presence of other code objects which the set-top terminal was supposed to have acquired but was unable, for whatever reason, to download.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a method of managing and controlling a download of programming code objects to a set-top terminal connected to a cable television system so as to prevent disruptions to service by the set-top terminal that may arise if only some of a list of code objects specified in a download instruction message are successfully downloaded and might, therefore, function improperly or conflict with existing applications. The method of the present invention primarily operates by conditionally preventing the set-top terminal from enabling and executing any code object downloaded in response to receipt of the download instruction message unless all code objects listed for download in the download instruction message are acquired by the set-top terminal.

If all the code objects listed for download in the download instruction message are acquired by the set-top terminal, the present invention allows the set-top terminal to proceed with enabling and executing the acquired code objects.

Preferably, the enabling of all the listed code objects is performed at the same time.

The step of conditionally preventing the set-top terminal from enabling and executing any code object downloaded in response to receipt by the set-top terminal of the download instruction message, unless all code objects listed for download in the download instruction message are acquired by the set-top terminal, is preferably performed in response to a list-only enable flag contained in the download instruction message. This allows the system operator to selectively prevent the set-top terminal for enabling and executing a portion of a list of code objects that the set-top terminal was to acquire. In other words, the set-top terminal will proceed to enable and execute any code objects downloaded in response to receipt by the set-top terminal of the download instruction message if the list-only enable flag in the download instruction message is negative, even if not all the listed objects were successfully acquired.

If all code objects listed for download in the download instruction message are not received by the set-top terminal, the method of the present invention may include purging from memory all the code objects that were downloaded by the set-top terminal in response to receipt of the download instruction message.

The present invention also encompasses the system and hardware for implementing the above-described method. For example, the present invention also encompasses a system for managing and controlling the download of programming code objects to a set-top terminal connected to a cable television system so as to prevent disruptions to service by the set-top terminal that may arise if only some of a list of code objects specified in a download instruction message are successfully downloaded and might, therefore, function improperly or conflict with existing applications. This system preferably includes: (1) at least one set-top terminal connected to the cable television system for receiving the data signal from the system headend; and (2) a system headend comprising a processor and transmitter for transmitting to the set-top terminal a download instruction message instructing the set-top terminal to download from the data signal a list of code objects. The set-top terminal typically includes a processor for executing programming, a memory for storing data and programming and a tuner for providing the data signal to the processor so that the set-top terminal can download code objects from the data signal. According to the present invention, the set-top terminal conditionally does not enable or execute any code object downloaded in response to receipt of the download instruction message unless all code objects listed for download in the download instruction message are acquired by the set-top terminal.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE INVENTION

A related patent application, U.S. Serial No. 60/130,328 (incorporated herein by reference in its entirety) comprehensively describes a proprietary method and system for downloading programming objects to set-top terminals in a cable system.

Figure 1:
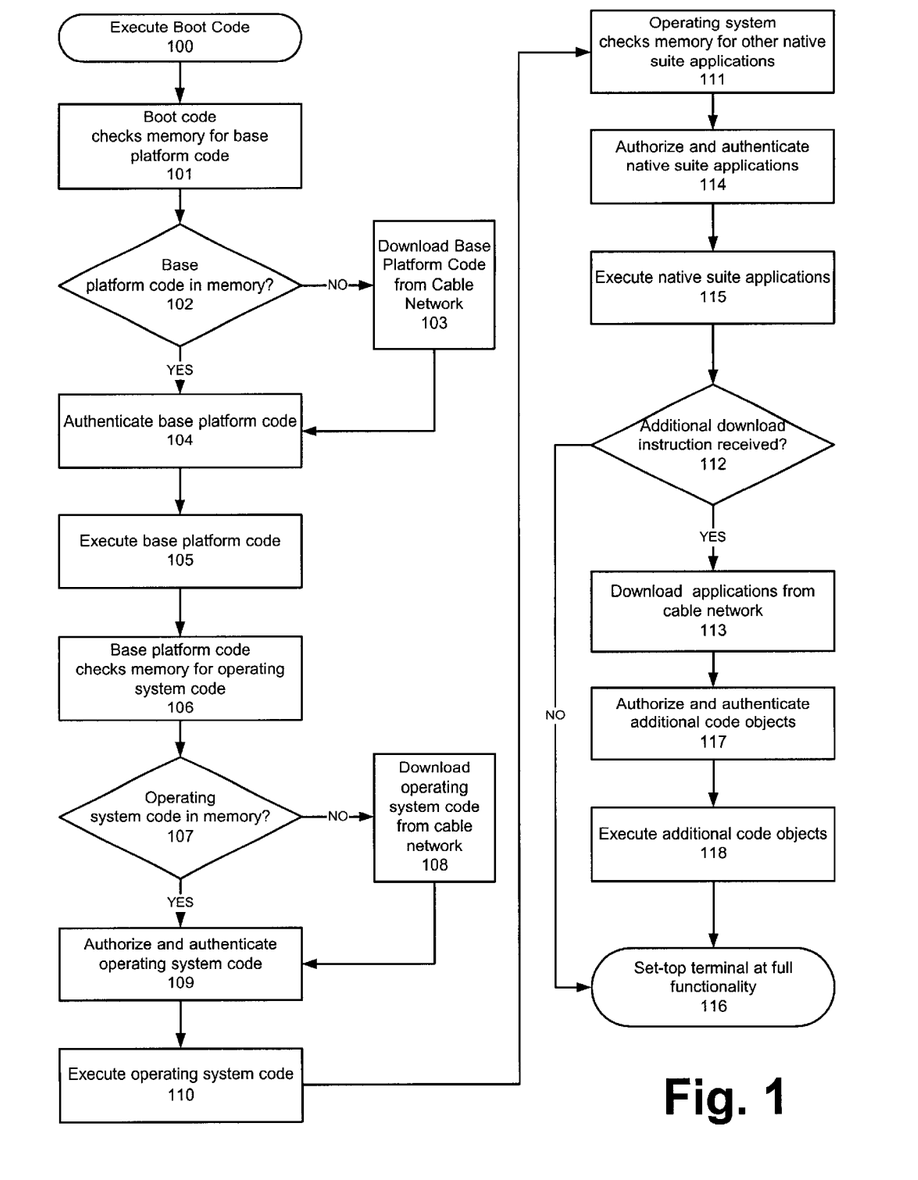
FIG. 1 is a flowchart showing the basic sequence in which programming objects are acquired by the set-top terminal according to a related invention.

FIG. 1 is a flowchart that illustrates the basic sequence in which programming objects are acquired by the set-top terminal over the cable system according to that method.

Figure 2:
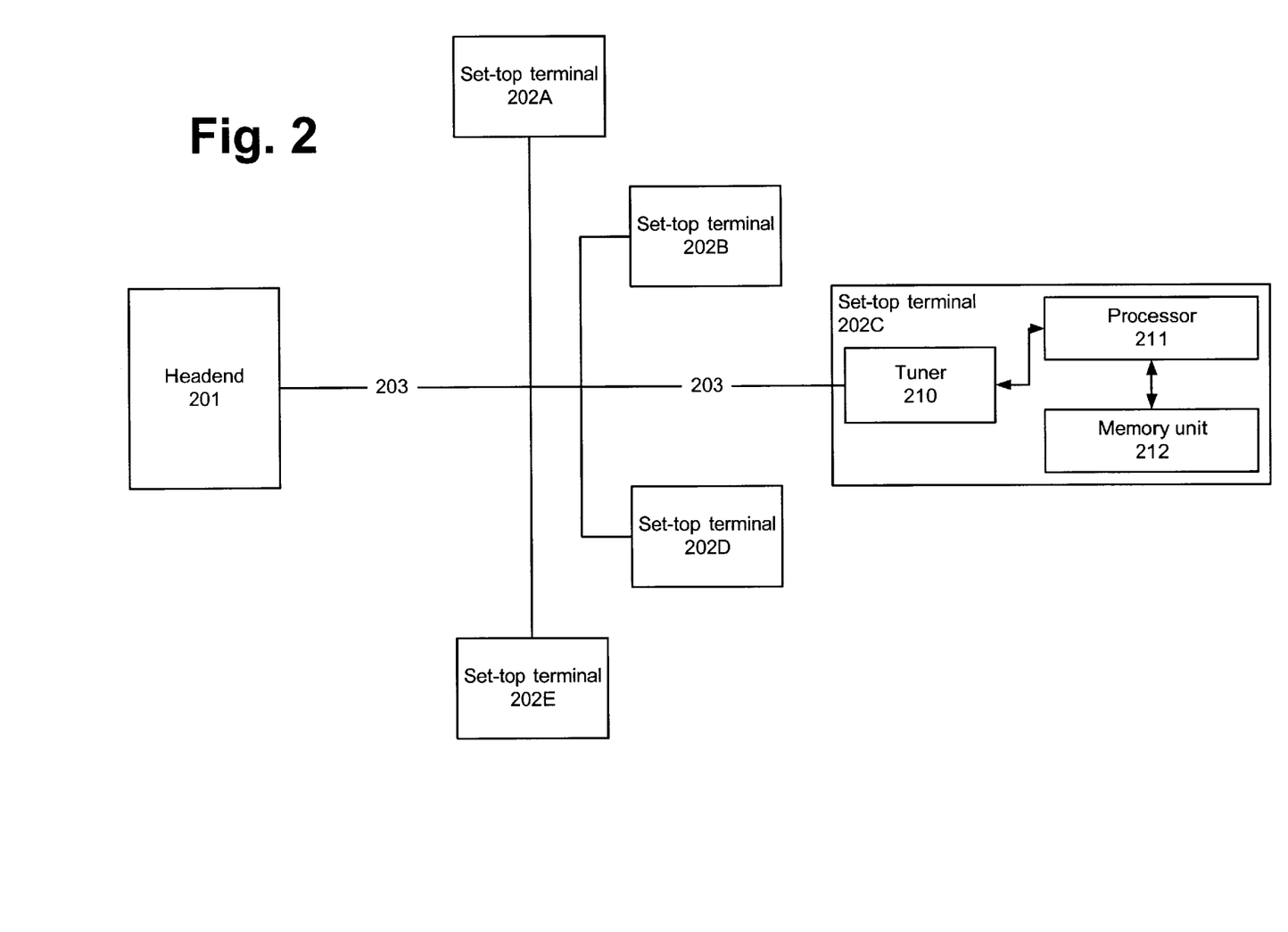
FIG. 2 is a block diagram of the basic elements of a cable television system with which the present invention is practiced.

FIG. 2 is a block diagram showing the basic elements of a cable television system which operates using the present invention.

With references to FIGS. 1 and 2, a set-top terminal (202; FIG. 2) executes an automatic boot process immediately following connection of power to the set-top terminal. As shown in FIG. 1, the boot process begins with the set-top terminal executing a piece of programming known as the boot code (100). The boot code is a programming object that is factory-loaded into the read-only memory (ROM) of the set-top terminal. As with all programming executed by the set-top terminal (202), the boot code is stored in the memory unit (212; FIG. 2) and executed by the processor (211; FIG. 2)

In another alternative, the set-top terminal (202) may not initiate the boot process show in FIG. 1 until both power and a data transport stream from the headend (201; FIG. 2) have been connected to the terminal (202). The set-top terminal may also execute the boot code (100) in response to a reset signal received, for example, from the headend (201), i.e., the system operator.

When running, the boot code provides minimal programming for the set-top terminal (202) to allow the terminal to bring itself up to full functionality. The boot code does not typically allow the set-top terminal (202) to provide any services, but is designed only to acquire, if necessary, and load higher-level programming. The term "boot code" as used herein comprises the minimal code needed to accomplish this functionality.

As shown in FIG. 1, the boot code will first acquire the base platform code (101–105). The boot code will first check the memory (212; FIG. 2) of the set-top terminal (202) to determine if the base platform code is stored there (101, 102). If the base platform code is in memory, the processor (211; FIG. 2) of the set-top terminal (202) running the boot code will authenticate the base platform code (104) and, assuming the code passes the authentication process, will begin executing the base platform code (105).

If the base platform code is not in memory (102), the set-top terminal (202) will access the data transport stream from the headend (201; FIG. 2), locate a transmission of the base platform code within the headend signal using the tuner (210; FIG. 2) and download the base platform code (103). The base platform code is preferably transmitted to the set-top terminal on an out-of-band transport stream for storage in a Flash memory portion of the memory unit (212). However, the base platform code may be transmitted on an in-band control channel.

The downloaded platform code is then authenticated (104), as before, and executed. The boot code will preferably re-authenticate the base platform code every time it launches the base platform object regardless of whether the base platform code has been found in memory (212) or downloaded.

Once the base platform code is launched, control of the terminal (202) passes to the base platform code from the boot code. When executing the base platform code, the set-top terminal (202) can provide minimal functionality to subscribers, for example, allowing the subscriber to receive television programming from the cable system. However, in order for the set-top terminal to attain full functionality, the base platform code must acquire an additional programming known as the native suite. The native suite comprises an operating system object and, usually, additional application programs. These additional or "resident" applications are computer programs that run on the set-top terminal under the operating system. The resident applications provide the capabilities of the set-top terminal that are in addition to watching television.

As shown in FIG. 1, the base platform code, when first executed or reset by a signal from the headend, checks (106, 107) the memory unit (212) to determine if an operating system code object is already resident in the terminal (202). The operating system (O/S) is typically code from a third party (such as Microsoft's WinCE™) that allows the set-top terminal (202) to run the various resident applications of the native suite. The operating system code typically uses an additional embedded code module provided by the manufacturer of the set-top terminal which interfaces the operating system with the particular hardware of that set-top terminal to enable the operating system to function with that specific set-top terminal.

If the operating system code object is found in memory, the base platform code authorizes and authenticates the operating system code (109) from memory. If the operating system code is not in memory, the set-top terminal (202) running the base platform code, will access the data transport stream from the headend (201), and locate and download an appropriate operating system code object (108). The downloaded object is then authorized and authenticated (109).

Once authorized and authenticated, the operating system code is executed (110). When running the operating system code, the set-top terminal can also execute the additional code objects or applications of the native suite that provide any variety of services to subscribers. The base platform code can be configured to acquire all the elements of the native suite along with the operating system. Alternatively, as illustrated in FIG. 1, the operating system, when running, may be configured to acquire the other elements of the native suite.

Preferably, the processor (211) running the operating system code first checks the memory unit (212) for the expected elements of the native suite (111). If the native suite applications are in memory (112), the operating system can authorize and authenticate those applications (114) and execute them (115).

The processor (211) will then determine if it has been instructed to acquire any additional objects (112), including native suite applications not found in memory. If not, the set-top terminal is at full functionality (116). If, however, the processor (211) needs to acquire additional objects, those applications are downloaded from the cable network (113). The downloaded application objects are authorized and authenticated (117), and executed (118).

Once the operating system and all other specified applications are running, the set-top terminal has achieved full functionality (116). As will be clear to those skilled in the art, the list of native suite applications may vary from set-top terminal to set-top terminal. A subscriber who subscribes to fewer services from the cable system may need fewer native suite applications than a subscriber who pays for all the services available. Additionally, as new services are added, applications may be added to the native suite to support the new services. Thus, the list of applications, which constitute the native suite, can vary with both time and subscriber needs and preferences.

As noted above, the base platform code may acquire the native suite consisting of the operating system and resident applications during initialization of the set-top terminal or upon receipt of an instruction to do so from the system operator. Consequently, when the system operator desires to alter or upgrade the operating system or resident applications in the set-top terminal, the system operator may send an initialization message to the set-top terminal via the cable network which instructs the base platform code to acquire or reacquire the operating system and resident applications then being broadcast over the cable network. Alternatively, the system operator can signal the operating system to acquire or re-acquire elements of the native suite. These messages from the headend (201) may also be, at the same time, altering the list of elements that define the terminal's native suite.

While this arrangement allows the capabilities of the set-top terminal to be readily upgraded, altered or enhanced, interruptions to service for the set-top user may also result. For example, when the base platform code or operating system code receives an instruction to acquire new code objects over the cable network, that instruction will specify the code object or objects which are to be acquired. If more than one object is to be acquired, a problem may result if only one of the objects is actually received by the set-top terminal (202).

Specifically, the terminal (202) may receive and enable the first code object which it has been instructed to acquire. If then, for whatever reason, the set-top terminal is unable to acquire the other code objects that it has been instructed to download, the functions performed by those unreceived code objects will be unavailable to the set-top terminal user. Moreover, code objects are frequently inter-related. Consequently, the object that has been downloaded may not function properly without the other objects that were to have been downloaded, but were not received. Similarly, enablement and execution of the new code object which has been received may interfere with the execution of the software or firmware previously resident on the set-top terminal if the other objects specified for download are not acquired and executed as well.

Therefore, as noted above, there is a need in the art for a method of controlling the download of code objects by a set-top terminal in a cable television system so as to prevent the execution of newly-acquired code objects that require the presence of other code objects which the set-top terminal was supposed to have acquired but was unable, for whatever reason, to download. The present invention overcomes this possible problem, in the following manner.

The set-top terminal (202) running the base platform or operating system code will identify the list of objects it has been instructed to acquire. Typically, this list will be a complete list of the objects in the native suite. However, it is possible that the list of objects to be acquired may represent only a portion of the native suite.

The list of objects to be acquired and the instruction to acquire them may come from either a message received from the system operator via the headend (201) or may be part of the terminal's programming, either base platform or operating system code. In either case, the set-top terminal (202) will begin acquiring the listed objects from the transport stream received over the cable system (203) from the headend (201). The terminal (202) will not, however, enable or execute any of the received objects until all the objects listed to be acquired have been successfully received. The programming managing the download, e.g., the base platform code or the operating system code, is modified or reconfigured to require successful acquisition of all listed code objects before any of the objects are enabled and executed. In this way, the set-top terminal (202) will not end up with only a fraction of the objects it has been instructed to acquire and execute, or with an object that conflicts with programming already resident.

Figure 4:
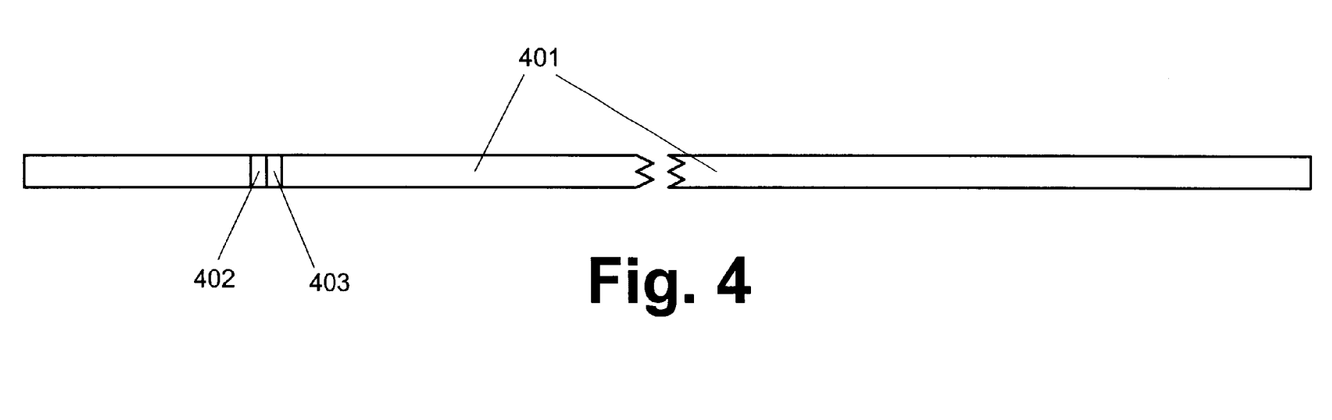
FIG. 4 is a graphic illustration of a download control message according to the present invention.

A graphic illustration of a message instructing a set-top terminal to download new or additional code objects is presented in FIG. 4. As shown in FIG. 4, the message (401) may also contain a list-only enable flag (402) that will instruct the set-top terminal (202) whether it must enable only the entire list of objects being acquired or can accept, enable and execute object representing only a fraction of those listed as to be acquired. This list-only enable flag (402) need only be a single bit within the message (401) and is, of course, either affirmative (i.e., "present" or "on") or negative (i.e., "not present" or "off"). In other words, if the list-only enable flag is present, all of the objects received are enabled simultaneously or nearly simultaneously. Therefore, no objects will be enabled until all the objects in the list have been properly received. The simultaneous enablement of all the received objects will create the least possible disruption in service to the user of the set-top terminal.

In addition to enabling and executing the received code objects only when all listed objects have been received, the set-top terminal (202) may be programmed to purge listed objects from memory that have been received if all program objects in the object group are not received. In other words, if the set-top terminal (202) begins acquiring a list of objects that it has been instructed to acquire, and not all of the listed objects are eventually received, it may be desirable to remove from memory any of the objects that were acquired but which will not be used or enabled due to the failure to acquire all objects in the object group. Consequently, as an option of the present invention, the set-top terminal (202) may be programmed to delete from memory any code objects which have been acquired as a list of objects to be received in the event that not all listed objects are eventually received, enabled and used.

The set-top uses the list identifier and the list version to identify those objects that comprise the defined object suite (most recent list of objects from the download message). If an object is added or removed from a list in a download message, the set-top will update its suite of objects in memory associated with that list by adding or removing those object(s). In addition, the list version can be used to force the upgrade of an object where the object version identified in the list of the download message is different than the object version that the set-top has in memory.

This function of purging different versions of objects in a list may also be governed by a flag (403), i.e. an auto purge flag, within the message (401) from the headend. Again, the flag (403) need only be a single bit that represents that the flag is either present or not present within the message. In this way, the system operator has the option of clearing the set-top terminal's memory (212) of all the listed objects of a different version than that specified in the download message.

Figure 3:
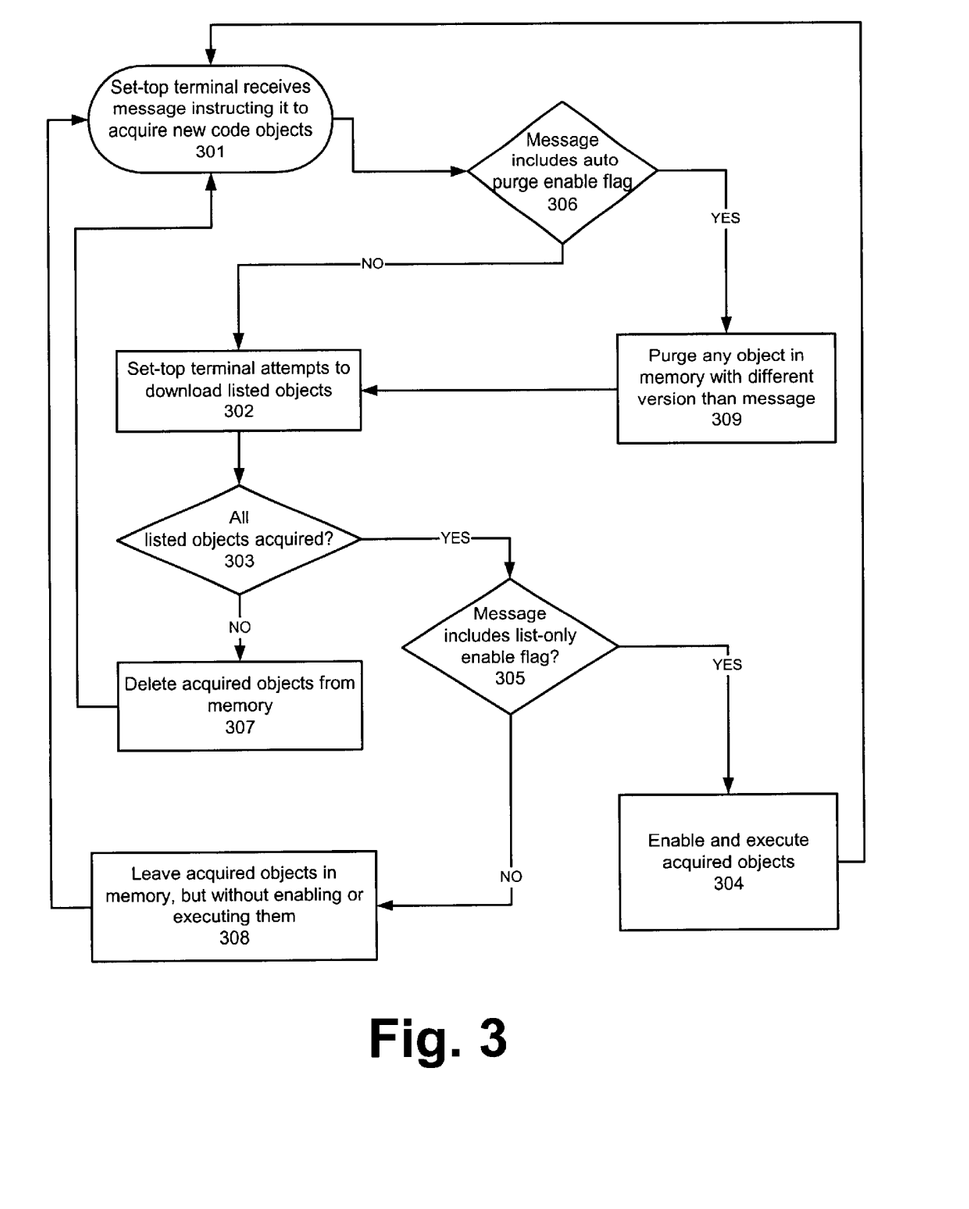
FIG. 3 is a flowchart showing a method of controlling and enabling a list of downloaded code objects according to the present invention.

This process is outlined in FIG. 3. As shown in FIG. 3, the method of the present invention begins with the set-top terminal receiving a message instructing it to acquire new or additional code objects from the cable system (301). The set-top terminal first checks to see if the auto purge flag is present or positive in the message (306). If so, the terminal purges objects appropriately that are different versions of an object specified for download in the incoming message (309). After the purging, or if the auto purge flag is negative (306), the set-top attempts to download the code objects listed in the message (302).

When the downloading is complete or has otherwise been terminated, perhaps by a time-out counter, the terminal will determine if all the objects it was instructed to acquire were successfully downloaded. (303). If the terminal failed to acquire all the specified objects, the terminal may delete all the objects that were acquired from memory (307).

If, on the other hand, all the objects have been acquired, the set-top terminal can proceed to enable and execute the objects. The terminal first check for the list 10 only enable flag (305). If the list enable flag is present or positive, the enablement of the downloaded objects is preferably performed simultaneously or nearly simultaneously, thereby treating the objects on the list as though they were a single object (304).

If the list enable flag is negative, but all objects have been received successfully, the set-top will leave the acquired objects in memory, but without enabling or executing them (308). If only some of the objects that were to be acquired as successfully received, the set-top terminal will delete all objects on the list (307).

Objects may be identified uniquely within a system environment by an object identifier and object version (i.e., object name and object_version). This object_name is unique within the download transport stream(s) available to an individual set-top terminal (202). The message, which instructs the set-top terminal (202) to acquire a list of objects, may identify both the object name/unique identifier and the version of the object desired. If the set-top already has that particular object, but a different version, it may be desirable to remove the object currently resident in the set-top terminal, and acquire the version identified in the instruction message. Preferably, the instruction message from the service provider which initiates the acquisition of new code objects also includes a flag in the message from the system operator which instructs the set-top terminal whether or not to automatically purge code objects already resident in the set-top terminal's memory which are identified in the message's object list by a transport unique object identifier (i.e., object_name), but being a version other than that listed in the message's object list (i.e., object version). Both the auto purge flag and the enablement flag, which requires reception of all listed code objects before any are enabled, need only be one bit long.

Under the principles of the present invention, then, a native or operating suite which consists of a number of code objects can be transmitted and used by the set-top terminals in a cable television system for all intents and purposes as though the suite were a single code object. This feature of the present invention allows system operators to minimize disruptions to service and confusion which might otherwise result when the set of code objects are only partially downloaded successfully.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated.

What is claimed is:

1. A system for managing and controlling a download of programming code objects to a set-top terminal connected to a cable television system so as to prevent disruptions to service by the set-top terminal that may arise said if only some of a list of code objects specified in a download instruction message are successfully downloaded and might, therefore, function improperly or conflict with existing applications, the system comprising:

at least one set-top terminal connected to said cable television system for receiving a data signal from a system headend, said set-top terminal comprising a processor for executing programming, a memory for storing data and programming and a tuner for providing said data signal to said processor, wherein said set-top terminal can download code objects from said data signal; and said system headend comprising a processor and transmitter for transmitting to said at least one set-top terminal a download instruction message instructing said set-top terminal to download from said data signal a list of code objects;

wherein said set-top terminal conditionally does not enable or execute any code object downloaded in response to receipt of said download instruction message unless all code objects listed for download in said download instruction message are acquired by said set-top terminal;

wherein said set-top terminal, in response to an auto purge flag contained in said download instruction message, purges from memory all code objects with an identical name, but a different version, than a corresponding object downloaded by said set-top terminal in response to receipt of said download instruction message.

2. The system of claim 1, wherein said set-top terminal enables all downloaded code objects at the same time if all code objects listed for download in said download instruction message are acquired by said set-top terminal.

3. The system of claim 1, wherein:

said download instruction message comprises a list-only enable flag; and said set-top terminal responds to said list-only enable flag to determine whether to enable and execute any code object downloaded in response to receipt by said set-top terminal of said download instruction message.

4. The system of claim 3, wherein said set-top terminal enables and executes any code objects downloaded in response to receipt by said set-top terminal of said download instruction message if said list-only enable flag in said download instruction message is negative.

5. The system of claim 1, wherein, if all code objects listed for download in said download instruction message are not received by said set-top terminal, said set-top terminal purges from memory all code objects downloaded by said set-top terminal in response to receipt of said download instruction message.

6. A set-top terminal configured to be connected to a television system for receiving a data signal from a system headend, said set-top terminal comprising a processor for executing programming, a memory for storing data and programming and a tuner for providing said data signal to said processor, wherein said set-top terminal can download code objects from said data signal; and wherein said set-top terminal is programmed to receive a download instruction message instructing said set-top terminal to download from said data signal a list of code objects; and wherein said set-top terminal, in response to an auto purge flag contained in said download instruction message, purges from memory all code objects with an identical name, but a different version, than a corresponding object downloaded by said set-top terminal in response to receipt of said download instruction message.

7. The set-top terminal of claim 6, wherein said set-top terminal conditionally does not enable or execute any code object downloaded in response to receipt of said download instruction message unless all code objects listed for download in said download instruction message are acquired by said set-top terminal.

8. The set-top terminal of claim 6, wherein said set-top terminal enables all downloaded code objects at the same time if all code objects listed for download in said download instruction message are acquired by said set-top terminal.

9. The set-top terminal of claim 6, wherein:

said download instruction message comprises a list-only enable flag; and said set-top terminal responds to said list-only enable flag to determine whether to enable and execute any code object downloaded in response to receipt by said set-top terminal of said download instruction message.

10. The set-top terminal of claim 9, wherein said set-top terminal enables and executes any code objects downloaded in response to receipt by said set-top terminal of said download instruction message if said list-only enable flag in said download instruction message is negative.

11. The set-top terminal of claim 6, wherein, if all code objects listed for download in said download instruction message are not received by said set-top terminal, said set-top terminal purges from memory all code objects downloaded by said set-top terminal in response to receipt of said download instruction message.

* * * * *

UNITED STATES PATENT AND TRADEMARK OFFICE
CERTIFICATE OF CORRECTION

PATENT NO. : 6,813,778 B1  
DATED : November 2, 2004  
INVENTOR(S) : Christopher Poli et al.

It is certified that error appears in the above-identified patent and that said Letters Patent is hereby corrected as shown below:

<u>Title page,</u>  
Item [73], Assignee, change "General Instruments Corporation" to  
-- General Instrument Corporation --

Signed and Sealed this

Ninth Day of August, 2005

JON W. DUDAS  
*Director of the United States Patent and Trademark Office*